(12) United States Patent
Motzkau

(10) Patent No.: US 12,460,709 B2
(45) Date of Patent: Nov. 4, 2025

(54) STRAIN-WAVE GEARING

(71) Applicant: Schaeffler Technologies AG & Co. KG, Herzogenaurach (DE)

(72) Inventor: Uwe Motzkau, Tauberbischofsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/727,170

(22) PCT Filed: Dec. 7, 2022

(86) PCT No.: PCT/DE2022/100920
§ 371 (c)(1),
(2) Date: Jul. 8, 2024

(87) PCT Pub. No.: WO2023/131371
PCT Pub. Date: Jul. 13, 2023

(65) Prior Publication Data
US 2025/0102053 A1    Mar. 27, 2025

(30) Foreign Application Priority Data
Jan. 10, 2022 (DE) ............... 10 2022 100 356.6

(51) Int. Cl.
*F16H 49/00* (2006.01)
*F16H 57/04* (2010.01)
(52) U.S. Cl.
CPC ......... *F16H 49/001* (2013.01); *F16H 57/045* (2013.01); *F16H 57/0471* (2013.01); *F16H 57/0495* (2013.01); *F16H 2049/003* (2013.01)

(58) Field of Classification Search
CPC ................ F16H 49/001; F16H 57/045; F16H 2057/0495
See application file for complete search history.

(56) References Cited

U.S. PATENT DOCUMENTS 10,823,278 B2* 11/2020 Tezuka ............... F16H 1/32
11,092,225 B2*  8/2021 Mendel ............. F16H 49/001
(Continued)

FOREIGN PATENT DOCUMENTS

CN         112503159 A      3/2021
DE     102016207612 A1    11/2017
(Continued)

OTHER PUBLICATIONS

Japanese Patent Office, Office Action received in JP Application No. 2024-541195, Jun. 17, 2025, 8 pages (including translation).

*Primary Examiner* — Jake Cook
(74) *Attorney, Agent, or Firm* — Suiter Swantz IP

(57) ABSTRACT

A strain-wave gearing, in particular for an industrial robot, includes a first assembly, to which a flexible gearing element provided with an external toothing and formed as a flanged bushing is fastened, and a wave generator, intended to deform the flexible gearing element, and an output-side assembly which has an internal toothing meshing with the external toothing of the flexible gearing element. The output-side assembly is mounted in the first assembly by means of a rolling bearing, the rolling bearing being sealed towards both sides in each case by a seal that is effective between the first assembly and the output-side assembly, and one of these two seals delimiting, on its side facing away from the rolling bearing, a lubricant chamber which extends as far as the toothing of the flexible gearing element and of the output-side assembly.

7 Claims, 1 Drawing Sheet

(56) References Cited

U.S. PATENT DOCUMENTS

| | | | |
|---|---|---|---|
| 11,885,403 B2* | 1/2024 | Orii | F16J 15/3244 |
| 2020/0003288 A1 | 1/2020 | Mendel et al. | |
| 2020/0072338 A1 | 3/2020 | Tezuka et al. | |

FOREIGN PATENT DOCUMENTS

| | | |
|---|---|---|
| DE | 102017114175 B3 | 9/2018 |
| DE | 102017119461 A1 | 2/2019 |
| DE | 102017128423 A1 | 6/2019 |
| DE | 102018128930 A1 | 5/2020 |
| DE | 102019205338 A1 | 10/2020 |
| DE | 102019117942 A1 | 1/2021 |
| DE | 102020107990 A1 | 9/2021 |
| DE | 102020206602 A1 | 12/2021 |
| EP | 3387293 B1 | 8/2021 |
| JP | 2011174570 A | 9/2011 |
| JP | 2020509311 A | 3/2020 |
| WO | 2017206988 A1 | 12/2017 |

* cited by examiner

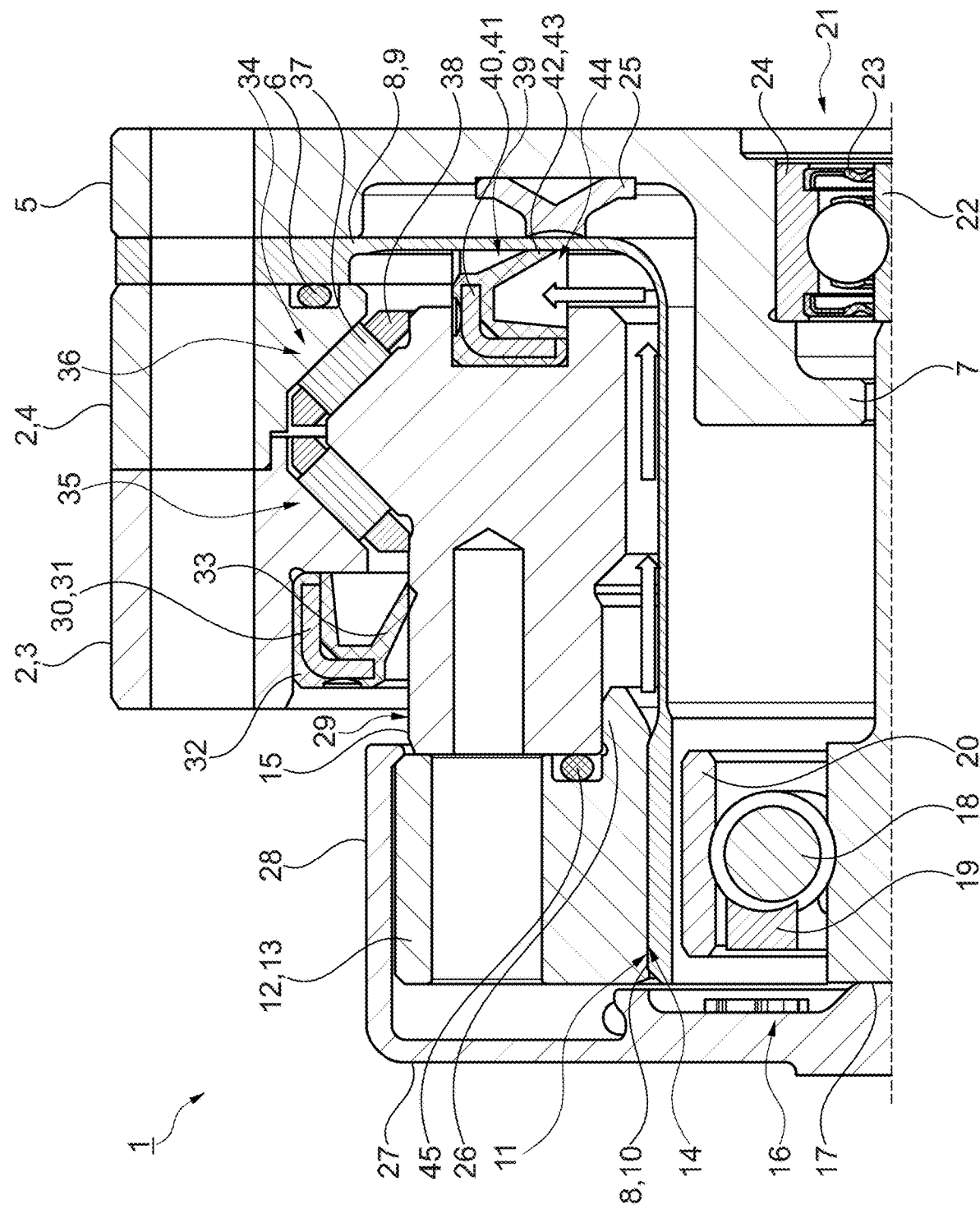

STRAIN-WAVE GEARING

CROSS-REFERENCE TO RELATED APPLICATIONS

This application is the U.S. National Phase of PCT Appln. No. PCT/DE2022/100920 filed Dec. 7, 2022, which claims priority to DE 10 2022 100 356.6 filed Jan. 10, 2022, the entire disclosures of which are incorporated by reference herein.

TECHNICAL FIELD

The disclosure relates to a strain-wave gearing suitable for use as an actuating gear mechanism of an industrial robot.

BACKGROUND

A generic actuating gear mechanism is known for example from DE 10 2016 207 612 A1. The known strain-wave gearing has a flexible toothed component in the form of a flanged bushing, which is at least indirectly attached to a surrounding component. A rigid toothed component, which acts as the output element of the strain-wave gearing and interacts directly with the flexible toothed component, is rotatably arranged in the surrounding component. Static seals are located at various points on the known strain-wave gearing.

Various embodiments of strain-wave gearings in which a flanged bushing is attached to an assembly which is rotatable as a whole are known, for example, in the documents DE 10 2018 128 930 A1, WO 2017/206988 A1 and DE 10 2017 128 423 A1. The three cases mentioned concern strain-wave gearings in electromechanical camshaft adjusters.

DE 10 2017 119 461 A1 discloses a rolling bearing for a strain-wave gearing. An inner ring of this rolling bearing has an inner ring with an elliptical circumferential contour. A seal is arranged between the inner ring and the outer ring of the rolling bearing, which is supported on the inner ring in a rotationally fixed manner and rests against the outer ring with an elliptical circumferential contour.

DE 10 2017 114 175 B3 discloses a strain-wave gearing having a flexible gearing element, which describes a modified collar shape. In this case, both the inner and the outer edge of a flat, annular disc-shaped section of the flexible gearing element merge into a cylindrical section, wherein an external toothing is located on the inner cylindrical section and the outer cylindrical section is significantly shorter than the inner cylindrical section in the axial direction of the gearing element and thus of the entire strain-wave gearing. Even with this modified collar shape, the flexible gearing element is subsumed under the term flanged bushing. In general, a flanged bushing has a sleeve-shaped, externally toothed section to which a radially outward-directed, annular disc-shaped section, i.e., collar, is connected. Typically, the external toothing of the sleeve-shaped section is located exclusively in an area of the sleeve-shaped section that is spaced apart from the collar.

A manipulator arm for a robot is already known from DE 10 2020 107 990 A1. The manipulator arm is adjustable by means of a printed circuit board motor and a gearbox, whereby the gearbox can be designed as a strain-wave gearing, cycloid gear or planetary gear.

SUMMARY

The disclosure is based on the object of specifying a strain-wave gearing which is suitable, among other things, for use in an industrial robot and which has been further developed compared to the prior art, in particular with regard to lubrication technology aspects.

According to the disclosure, this object is achieved by a strain-wave gearing having the features described herein. The strain-wave gearing comprises a first assembly to which a flexible gearing element designed as a flanged bushing and provided with external toothing is attached, as well as a wave generator provided for deforming the flexible gearing element. An output-side assembly of the strain-wave gearing has an internal toothing that meshes with the external toothing of the flexible gearing element. The output-side assembly is mounted in the first assembly by means of a rolling bearing, wherein the rolling bearing is sealed on both sides by a seal acting between the first assembly and the output-side assembly, and wherein one of these two seals, namely the inner seal, delimits a lubricant chamber on the side thereof facing away from the rolling bearing, which extends to the toothings of the flexible gearing element and the output-side assembly.

The disclosure is based on the consideration that actuating gear mechanisms used in robots in many cases have no rotation angle limitation. The lack of a rotation angle limitation, together with a pumping effect caused by the permanent deformation of a flexible gearing element, in particular the rolling of a toothing of a flexible gearing element on a rigid gearing element, can initiate a grease movement that leads to a pressure build-up within the actuating gear mechanism. Together with a lack of ventilation and a temperature increase that occurs during operation, which can be caused by friction as well as by a servomotor, conventional solutions ultimately pose the risk of a grease leakage from the actuating gear mechanism.

This risk is effectively counteracted in the strain-wave gearing according to the application in that one of the seals, which is referred to as an inner seal to distinguish it from other seals, separates a first lubricated space, namely the space in which is located the rolling bearing which supports the output-side assembly, from a second space, namely the space in which are located the intermeshing toothings of the flanged bushing on the one hand and the output-side assembly on the other hand. The latter space is also commonly referred to as the lubricant space.

A particular advantage is the fact that the lubricant chamber on the one hand and the rolling bearing supporting the output-side assembly on the other hand can be filled with different lubricants. In particular, the contact surfaces between the toothing of the flanged bushing and the internal toothing on the output-side can be lubricated with a comparatively thin, i.e., low-viscosity grease, whereas the said rolling bearing is lubricated with a relatively high-viscosity grease. The good flowability of the grease in the lubricant chamber, i.e., in the chamber which extends to the toothings of the flanged bushing and the output-side assembly, is adapted to a high speed of the wave generator. Compared to the speed of the wave generator, the output element is only pivoted slowly due to the characteristics of the strain-wave gearing as a high-reduction actuating gear mechanism.

On the other hand, the bearing with which the output-side assembly is mounted in the first assembly must absorb comparatively high forces. Both aspects, both the relative speeds that occur and the forces acting within the strain-wave gearing, underscore the advantage of using a relatively viscous, i.e., highly viscous lubricant to lubricate the rolling bearing, generally referred to as the main bearing, with which the output-side assembly is mounted in the first assembly.

Both the lubricant which immediately surrounds the flanged bushing, i.e., which is located in the lubricant chamber mentioned above, and the lubricant with which the main bearing is lubricated, can be a grease. Alternatively, for example, the lubricant chamber can be lubricated with oil and the main bearing with grease. In all cases, the internal seal ensures that the different lubricants do not mix or only mix insignificantly.

The inner seal is located, for example, between a front side of the output-side assembly and the collar of the flexible gearing element. In comparison to the external toothing of the flanged bushing, the collar thereof is deformed only relatively little during operation of the strain-wave gearing, if any significant deformation of the collar occurs at all. Thus, the inner seal, which is located on the front side of the output-side assembly, need only absorb small relative movements in the axial direction of rotating elements of the strain-wave gearing. Since the collar of the flexible gearing element is firmly connected to the first assembly, whereas the output-side assembly rotates, the inner seal is a dynamic seal. In particular, the inner seal can be designed as a contacting seal that contacts the collar of the flexible gearing element. For example, the seal has a metal core which is inserted into a front groove of the output-side assembly.

A compliant seal element, typically made of an elastomer material surrounding the optional metal core, can have a single seal lip or an arrangement of several seal lips which rest against the collar of the flexible gearing element, thus providing a one-sided or two-sided seal effect. In modified embodiments, a felt or PTFE ring, such as that used in stuffing pump packings, can also be used as the internal seal of the strain-wave gearing.

According to a possible further development, the strain-wave gearing comprises a third seal, which is fastened to the first housing assembly. In particular, the third seal can be held on a cylindrical inner portion of the first housing assembly. In a particularly compact design, there is a plane normal to the axis of rotation of the strain-wave gearing, i.e., a radial plane, which intersects both the third seal and the inner seal. In addition, this plane can also intersect the rolling bearing with which the output-side assembly is mounted in the first assembly.

Alternatively, the third seal attached to the first housing assembly can contact the collar of the flexible gearing element. The third seal is located opposite the seal that defines the lubricant chamber, which extends to the toothings of the flanged bushing and the output-side assembly.

The rolling bearing with which the output-side assembly is supported in the first assembly is also called the main bearing. The main bearing, for example, is a multi-row bearing, in particular a double-row angular contact roller bearing. Raceways of the rolling bearing can be formed by the same component of the output-side assembly into which the seal is inserted, which delimits the lubricant space extending up to the toothings of the flexible gearing element and the output-side assembly.

The output-side assembly of the strain-wave gearing can, as a whole or with a part of this assembly, describe a cylindrical basic shape which is located radially outside the external toothing of the flexible gearing element and at the same time radially inside a section of the first assembly. At the same time, the output-side assembly or a part of this assembly can be arranged radially outside a section of the first assembly. The latter section is in particular the section on which the third seal is located. In contrast to the inner seal, the third seal must absorb only small relative movements and is therefore also referred to as a quasi-static seal.

With this seal, a metal core is not necessary. The strain-wave gearing thus has various seals that can be designed differently according to the respective requirements.

BRIEF DESCRIPTION OF THE DRAWINGS

In the following, an exemplary embodiment of the disclosure is explained in more detail with reference to drawings. In the drawings:

FIG. 1 shows a strain-wave gearing in a sectional view.

DETAILED DESCRIPTION

A strain-wave gearing marked with reference symbol 1 is intended as an actuating gear mechanism for an industrial robot that is not shown further. With regard to the principal function of the strain-wave gearing 1, reference is made to the prior art cited at the outset.

The strain-wave gearing 1 comprises a first assembly 2, which is firmly connected to a robot arm and is also referred to as a housing assembly without restriction of generality. The housing assembly 2 comprises several housing components 3, 4, 5. The first housing component 3, like the second housing component 4, describes a ring shape, whereas the third housing component 5 is more extended in the direction of the central axis of the strain-wave gearing 1 and has an inner section 7 having a cylindrical basic shape.

Overall, the three housing components 3, 4, 5 thus describe a U-shape in the section shown in FIG. 1, wherein an annular circumferential space exists between the inner section 7 and the housing components 3, 4, into which an output-side assembly 12 of the strain-wave gearing 1 engages. The output-side assembly 12 is connected to another robot arm to be adjusted, or to an end effector of the robot. A static seal within the housing assembly 2 is designated with 6, and a static seal within the output-side assembly 12 is designated with 45.

The housing components 3, 4, 5 are firmly connected to each other by a screw connection (not shown). Furthermore, a flexible gearing component 8, which is designed as a flanged bushing, is connected to the housing components 3, 4, 5. The collar of the flexible gearing component 8, designated 9, is fixed between the middle housing component 4 and the housing component 5. In the region thereof projecting radially inward beyond the housing disc 6, the collar 9 can be deflected at least slightly elastically. A sleeve-shaped section 10 of the flexible gearing component 8, which can also be elastically deflected, adjoins the inner edge of the collar 9. The sleeve-shaped section 10 has an external toothing 11 which is spaced from the collar 9 and extends to the end face of the flanged bushing 8 opposite the collar 9. The external toothing 11 partially meshes with an internal toothing 14 of a ring gear 13, which is assigned to the output-side assembly 12. The output-side assembly 12 further comprises an annular output-side element 15 which is firmly connected to the ring gear 13 and which is rotatably mounted in the first assembly 2 and is located in the said annular circumferential region.

A wave generator 16 is provided for deforming the flexible gearing component 8 during operation of the strain-wave gearing 1. In the present case, the wave generator 16 has a shaft 17, which at the same time forms a rolling bearing inner ring on which roll rolling elements 18, namely balls, which are guided in a cage 19. The rolling bearing inner ring 17 is inherently rigid and has an elliptical, not circular, shape. The corresponding outer ring 20 is elastically flexible and adapts to the non-circular shape of the rolling bearing inner ring 17. As a result, the external toothing 11 is brought into engagement with the internal toothing 14 at two diametrically opposite points, while the internal toothing 14 is otherwise lifted off the external toothing 11. The area of the sleeve-shaped section 10 provided with the external toothing 11 rests loosely on the outer ring 20. By slightly different numbers of teeth of the external toothing 11 on the one hand and the internal toothing 14 on the other hand, it is ensured in a manner known per se that a full rotation of the shaft 17 is converted into only a slight pivoting between the first assembly 2 and the output-side assembly 12.

In the example shown, the shaft 17 is mounted in the housing assembly 2 by means of a ball bearing 21. The ball bearing 21 has an inner ring 22, seals 23, and an outer ring 24 inserted into the housing component 5. The outer ring 24 is inserted into a cylindrical inner peripheral surface of the inner section 7.

A seal 25 is held on the housing component 5 of the first assembly 2 in a flat, annular disc-shaped area radially outside the inner section 7, which seal contacts the collar 9 on the outer side thereof, that is to say, on the side facing away from the sleeve-shaped section 10. The seal 25 represents a quasi-static seal.

The outer peripheral surface of the sleeve-shaped portion 10 delimits a cavity which is further delimited by the output-side assembly 12, and is thus arranged substantially concentrically between the sleeve-shaped portion 10 and the annular output-side element 15. On the side of the sleeve-shaped section 10 facing away from the collar 9, the cavity extends to the toothings 11, 14. The toothings 11, 14 are lubricated with a lubricant, namely grease, which can move freely in the cavity, as illustrated by arrows in FIG. 1. In this case, a lubricant flow can be triggered in particular by the deformations of the gearing component 8. The said cavity represents a lubricant space which extends over the entire length of the sleeve-shaped section 10, measured in the axial direction. In the radial direction, the lubricant chamber has a non-uniform thickness. Among other things, the lubricant chamber is delimited by an annular circumferential web 26, which is formed by the ring gear 13 on the inner circumference thereof, adjacent to the internal toothing 14 and overlaps in the axial direction with the annular output-side element 15. On the front side of the ring gear 13 facing away from the annular web 26 there is an attachment part 27 designed as a cap, which represents a barrier for the lubricant which lubricates the toothings 11, 14 and also the wave generator 16. A cylindrical portion 28 of the attachment part 27 is held on the outer peripheral surface of the ring gear 13.

The annular output-side element 15, which is connected to the ring gear 13 at the front, has an outer sealing section 29. A seal 30 is effective between the sealing section 29, which represents a cylindrical outer peripheral surface, and the first housing component 3. The seal 30 is designed as a contact seal with a metallic core 31 and a surrounding seal element 32 made of an elastomer. A seal lip of the seal 30 is indicated with 33. In the axial direction next to the seal 30 there is a main bearing 34 with which the output-side assembly 12 is mounted in the housing assembly 2. In the present case, the main bearing 34 is designed as a double-row angular contact roller bearing, with the rolling element rows designated 35, 36. The rolling elements, i.e., rollers, designated 37 are arranged in an X-arrangement in the main bearing 34, i.e., rolling bearing, and are guided in cages 38. The double-row rolling bearing 34 is able to accommodate radial loads, axial loads, and tilting loads. The main bearing 34 is sealed on one of the end faces thereof by the seal 30, and is lubricated with a grease that is more viscous than the lubricant for lubricating the flexible gearing component 8.

On the opposite side, the main bearing 34 is sealed by a seal 40, which is referred to as an inner seal and is located on a front-side sealing section 39. The seal 40 is opposite the seal 25. In the case of the seal 40, a metallic core is designated by 41, a seal element by 42, and a seal lip by 43. Overall, the seal 40, the basic structure of which, apart from the different orientation of the elements 41, 42, corresponds to the structure of the seal 30, is inserted into a front-side groove 44 of the annular output-side element 15. The seal lip 43 rests on the collar 9. The seal 40 separates the space in which the main bearing 34 is located from the space in which the lubricated toothings 11, 14 are located, in terms of lubrication. There is therefore no significant mixing of the different lubricants. Depending on the application, the lubrication can be designed as lifetime lubrication, or options for relubrication can be provided.

LIST OF REFERENCE SYMBOLS

1 Strain-wave gearing
2 Housing assembly, first assembly
3 First housing component
4 Second housing component
5 Third housing component
6 Seal within the first assembly
7 Inner section of the first housing component
8 Flexible gearing component
9 Collar of the flexible gearing component
10 Sleeve-shaped section of the flexible gearing component
11 External toothing
12 Output-side assembly
13 Ring gear
14 Internal toothing
15 Annular output-side element
16 Wave generator
17 Inner ring, adjusting shaft
18 Rolling element
19 Cage
20 Outer ring
21 Ball bearing
22 Inner ring of the ball bearing
23 Ball bearing seal
24 Outer ring of the ball bearing
25 Seal between the inner section 7 and the gearing component 8
26 Ring-shaped web
27 Attachment part
28 Cylindrical section of the attachment part
29 Outer sealing section of the output-side element 15
30 Seal
31 Metallic core
32 Seal element
33 Seal lip
34 Double-row rolling bearing, main bearing
35 Row of rolling elements
36 Row of rolling elements
37 Rolling element, roller
38 Cage
39 Front sealing section
40 Seal between element 15 and gearing component 8, inner seal
41 Metallic core
42 Seal element
43 Seal lip 44 Front groove
45 Seal within the output-side assembly

The invention claimed is:

1. A strain-wave gearing, comprising:
a first assembly,
a flexible gearing element attached to the first assembly, the flexible gearing element being a flanged bushing and provided with an external toothing,
a wave generator provided for deforming the flexible gearing element, and
an output-side assembly which has an internal toothing meshing with the external toothing of the flexible gearing element,
wherein the output-side assembly is mounted in the first assembly by a rolling bearing, wherein the rolling bearing is sealed on both sides by a first seal and a second acting between the first assembly and the output-side assembly, and wherein the first seal delimits a lubricant chamber on the side thereof facing away from the rolling bearing, which extends as far as the external toothing of the flexible gearing element and the internal toothing of the output-side assembly,
wherein the first seal is arranged between an end face of the output-side assembly and a collar of the flexible gearing element, wherein the first seal is a contact seal which contacts the collar, wherein the first seal has a metal core which is inserted into a front-side groove of the output-side assembly.

2. The strain-wave gearing according to claim 1, further comprising a third seal which contacts the collar of the flexible gearing element and is opposite the first seal which delimits the lubricant chamber which extends to the external toothing of the flexible gearing element and the internal toothing of the output-side assembly.

3. The strain-wave gearing according to claim 2, wherein the third seal is held on the first assembly.

4. The strain-wave gearing according to claim 1, wherein the output-side assembly has a cylindrical shape which is located radially outside the external toothing of the flexible gearing element and at the same time radially inside a section of the first assembly.

5. The strain-wave gearing according to claim 1, wherein the rolling bearing, with which the output-side assembly is mounted in the first assembly, is a double-row angular contact roller bearing.

6. The strain-wave gearing according to claim 5, wherein raceways of the rolling bearing are formed by an annular output-side element of the output-side assembly into which the first seal is inserted, which delimits the lubricant chamber extending up to the external toothing of the flexible gearing element and the internal toothing of the output-side assembly.

7. The strain-wave gearing according to claim 1, wherein the rolling bearing, on the one hand, and the lubricant chamber separated from the rolling bearing by the first seal and extending as far as the external toothing and the internal toothing, on the other hand, are filled with different lubricants.

* * * * *